United States Patent [19]
Fowler

[11] 4,176,860
[45] Dec. 4, 1979

[54] STREET ADDRESS LOCATING AID

[75] Inventor: Eugene W. Fowler, Sun City, Ariz.

[73] Assignee: Gene Fowler and Friends Inc., Sun City, Ariz.

[21] Appl. No.: 909,214

[22] Filed: May 25, 1978

[51] Int. Cl.² ............................................. G09B 29/00
[52] U.S. Cl. ..................................... 283/34; 235/88 N
[58] Field of Search ................. 283/1 R, 1 A, 32, 34; 235/83, 84, 74, 88 R, 113; 40/113, 70

[56] References Cited
U.S. PATENT DOCUMENTS

| | | | |
|---|---|---|---|
| 838,132 | 12/1906 | Neal | 235/88 |
| 998,603 | 7/1911 | Diefenbach | 235/88 |
| 1,300,808 | 4/1919 | Bacon | 283/32 |
| 1,311,682 | 7/1919 | Drew | 235/88 X |
| 1,546,928 | 7/1925 | Graham | 283/34 X |
| 3,718,519 | 2/1973 | Montgomery | 235/88 R X |

*Primary Examiner*—Robert L. Spicer, Jr.
*Attorney, Agent, or Firm*—Kinney, Lange, Westman and Fairbairn

[57] ABSTRACT

A street address locating aid includes two printed paper discs. Street addresses and cross streets are printed in concentric circles on both sides of each disc. A printed paper carrier having first and second essentially parallel sheets is mounted on opposite sides of the two discs. Each of the two sheets of the carrier include "street address" and "location near" apertures through which a particular street address and the corresponding cross street are exposed. By rotating the discs, different street addresses can be selected and the cross street near that address is displayed. The two discs are mounted so that they are partially overlapping within the carrier but so that neither disc obstructs the view of the street address and location near apertures associated with the other disc.

3 Claims, 5 Drawing Figures

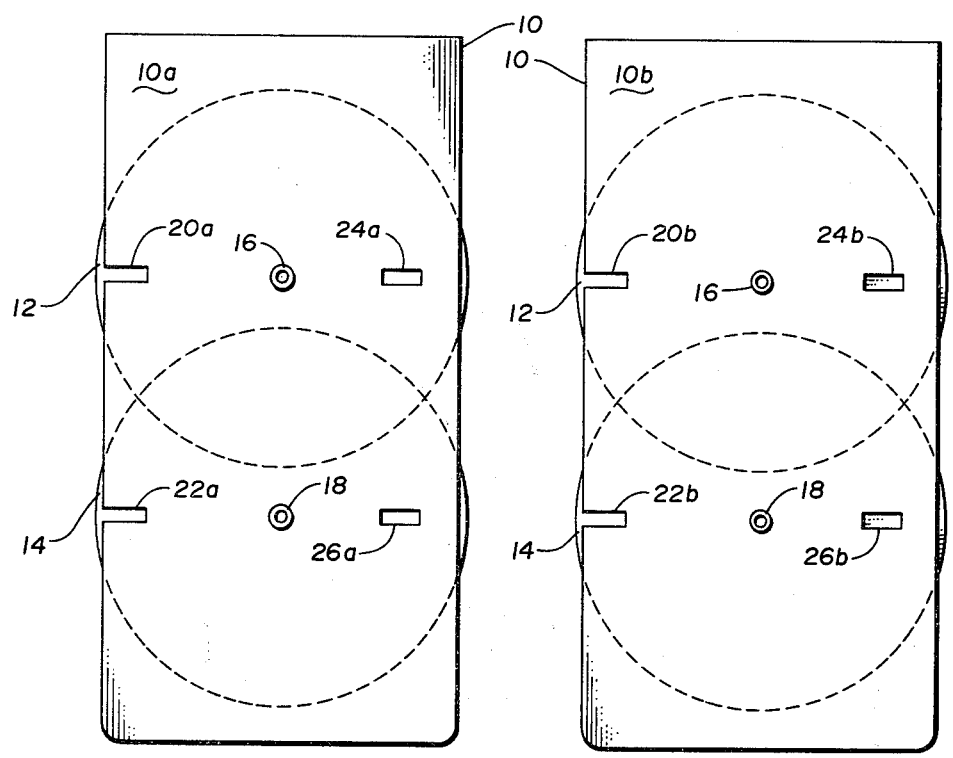
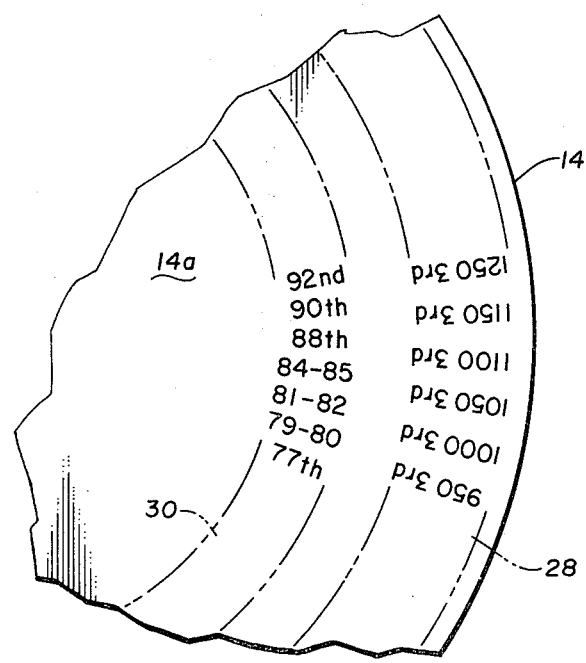

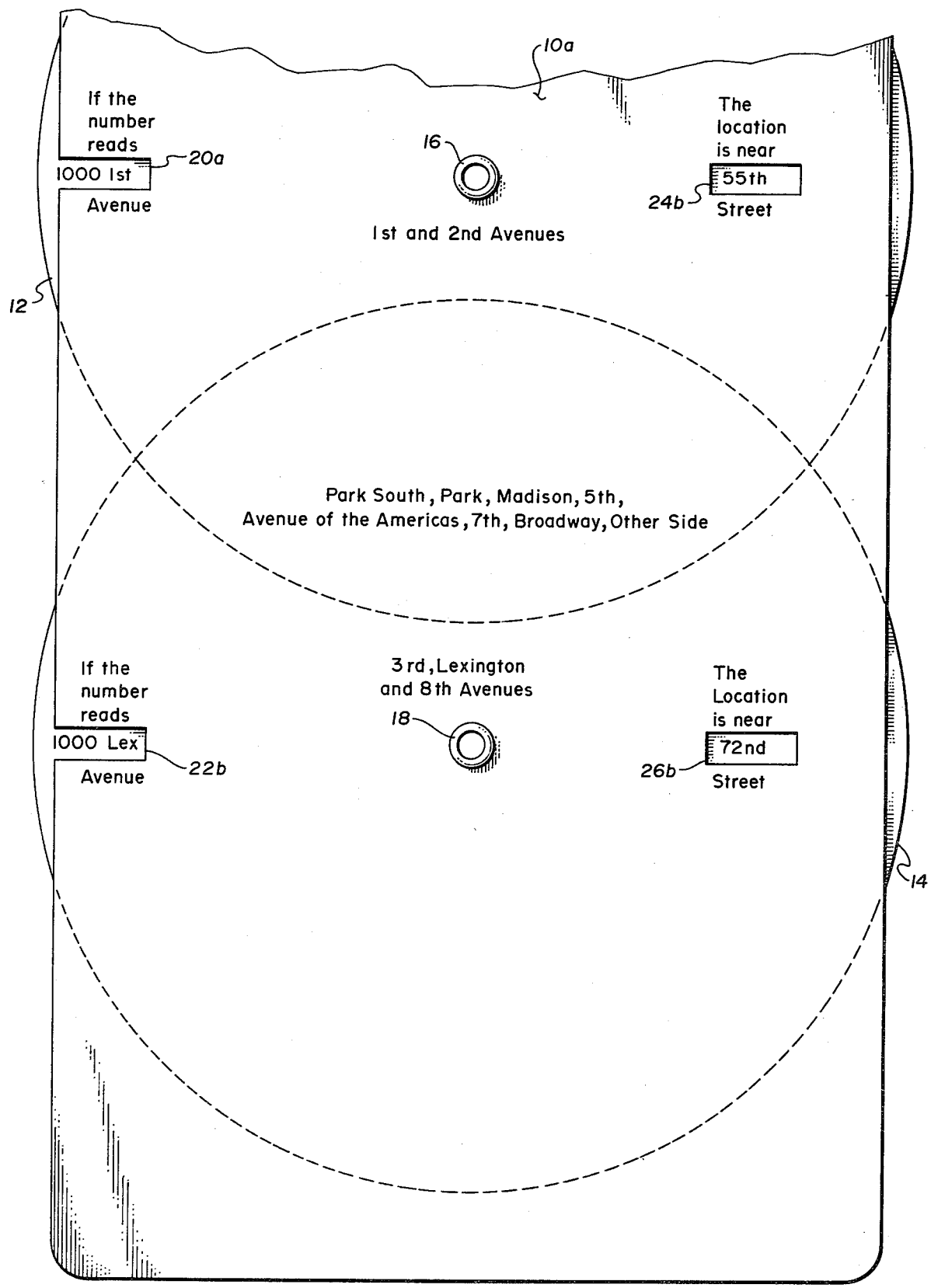

STREET ADDRESS LOCATING AID

BACKGROUND OF THE INVENTION

The present invention is an aid for use by travelers and other persons unfamiliar with the street addresses and streets in a city. In particular, the present invention is a street address locating aid which indicates and displays the particular cross street which is near a selected street address.

Street address locating aids have been used in the past in the form of slide charts, formulae, and calculators which provide an indication of a cross street when a particular street or address is known. These devices are particularly useful for travelers and other persons unfamiliar with the streets and avenues of a large metropolitan area, such as New York City.

In the past, these devices have either been large, to accomodate the large number of streets and avenues of interest, or have been small (e.g. shirt pocket size) but with an extremely limited amount of information. The very large devices are clumsy to handle and are generally undesirable for use by many travelers. The smaller devices suffer from a limited utility, since often the address of interest is not contained on the device. Further improvements in the field of street address locating aids are certainly needed.

SUMMARY OF THE INVENTION

The street address locating aid of the present invention includes first and second printed paper discs, a printed paper carrier having first and second essentially parallel sheets, and first and second connecting means for rotatably connecting the first and second discs at their respective centers between the first and second essentially parallel sheets of the carrier. The paper discs each contain a pair of concentric circles of information printed on both sides of the discs. Printed on first circles are a plurality of street addresses, and printed on second concentric circles are a plurality of cross streets.

The first and second sheets of the carrier each include two "street address" apertures and two "location near" apertures. Street addresses on the first circle of the discs are exposed at the street address apertures, while corresponding cross streets are displayed and exposed at the location near apertures.

The large amount of information contained in the street address locating aid of the present invention is achieved by the use of two discs printed on both sides together with the four sets of street address and location near apertures. In addition, the discs are spaced with respect to one another so that they overlap partially within the carrier, but do not overlap to the extent that they obstruct the apertures.

BRIEF DESCRIPTION OF THE DRAWINGS

FIGS. 1A and 1B show opposite sides of the street address locating aid of the present invention.

FIG. 2 shows a partial view of one side of one disc used in the stret address locating aid of the present invention.

FIG. 3 is a more detailed view of the front side of the street address locating aid shown in FIG. 1A.

DETAILED DESCRIPTION OF THE PREFERRED EMBODIMENTS

Figure 4:
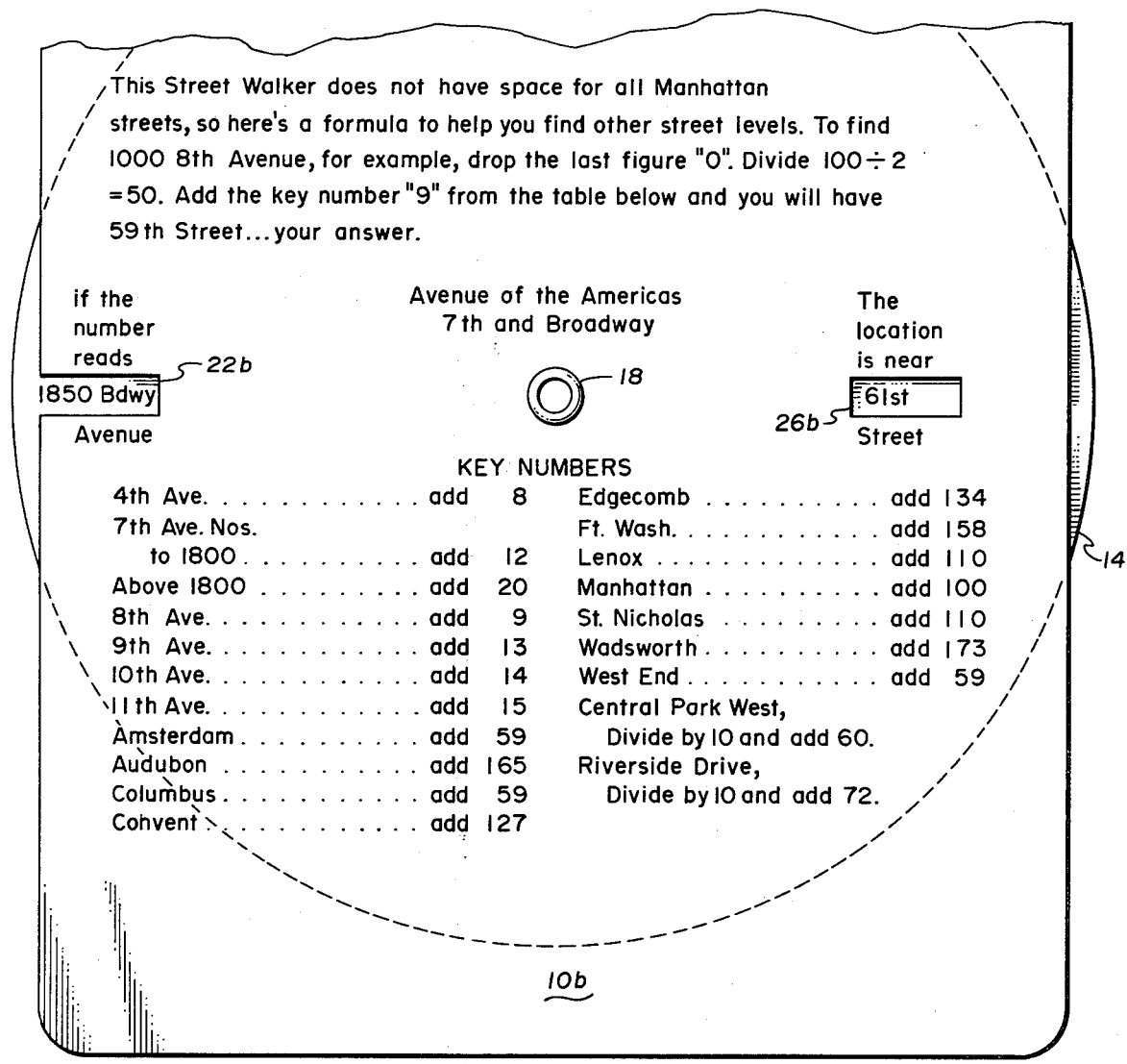
FIG. 4 is a more detailed view of a portion of the backside of the street address locating aid shown in FIG. 1B.

As shown in FIGS. 1A and 1B, the street address locating aid of the present invention includes a printed paper carrier 10 having a front or first sheet 10a and a back or second sheet 10b. Located between parallel sheets 10a and 10b are first and second printed paper discs 12 and 14. Each of these discs has information printed on each side in the form of concentric circles of information. As shown in FIGS. 1A and 1B, the diameter of discs 12 and 14 is slightly larger than the width of carrier 10, so that a small portion of each disc extends beyond the edge of carrier 10. This permits easy turning of the discs by the user.

Discs 12 and 14 are connected rotatably by suitable connecting means such as rivets 16 and 18, respectively. Carrier 10 is provided with four sets of apertures corresponding to each side of each of dials 12 and 14. Apertures 20a, 20b, 22a and 22b are "street address" apertures which permit a street address contained on one concentric circle of information of the corresponding disc 12 or 14 to be displayed. Apertures 24a, 24b, 26a and 26b are "location near" apertures which display cross streets from the second concentric circle of information on the respective discs. The position of the street address and location near apertures is selected so that the particular street address exposed at the street address aperture corresponds to the particular cross street then being exposed at the location near aperture.

FIG. 2 shows a portion of the front side 14a of disc 14. As shown in FIG. 2, the street addresses appear in an outer concentric circle 28, while the cross streets appear in an inner concentric circle 30. Since in the embodiment shown in FIGS. 1A and 1B the address apertures and location near apertures are on opposite sides of the center of each disc, the addresses of circle 28 are inverted with respect to the cross streets of circle 30.

FIG. 3 shows a more detailed view of the street address locating aid as shown in FIG. 1A. In the embodiment shon in FIG. 3, the addresses are addresses from New York City. The addresses displayed in aperture 20a are those from First and Second Avenues and the corresponding cross street is displayed in aperture 24a. The Third Avenue, Lexington Avenue, and Eighth Avenue addresses are displayed at aperture 22a, and corresponding cross streets are displayed in aperture 26a. In one preferred embodiment of the present invention, when the 1000 1st Avenue and 1000 Lexington Avenue addresses are displayed in apertures 20a and 22a, respectively, the address displayed in aperture 20b is 1000 Park Avenue and the address displayed in aperture 22b is 1000 Avenue of the Americas. the street displayed in location near aperture 24b is 84th Street, while the street displayed in location near aperture 26b is 37th Street. this represents the reference position of the device, in which the "1000" address number appears in all four apertures. This permits the user to obtain a reference as to how the street addresses correspond to the various cross streets. As discs 12 and 14 are moved from the reference position, the address numbers on opposite sides of the disc do not necessarily correspond to one another.

In order to further extend the usefulness of the street address locating aid of the present invention, the preferred embodiment of the present invention includes a known formula by which still further addresses which are not included on discs 12 and 14 can be derived. This formula is shown in FIG. 4, which is a partial view of the backside of the street address locating aid shown in FIG. 1B. As described in FIG. 4, the formula includes dividing the address number by a predetermined number and then adding a "key number" for the particular avenue. FIG. 4 shows only a few of the key numbers which are listed in a preferred embodiment of the present invention.

It has been found that the present invention provides at least as much, if not more, information on street addresses than is possible with much larger devices. In a preferred embodiment, the present invention is generally rectangular in shape, and is small enough to fit into a shirt pocket or be carried in a checkbook. A preferred size is a width of less than about 10 cm and a length of less than about 13 cm. In one successful embodiment, the street address locating aid is approximately 6 cm by 11.5 cm. By use of the double sided configuration, with dual overlapping discs and the formula and key number table, the present invention provides significantly more information than any device of similar size.

In a preferred embodiment, the first and second sheets 10a and 10b of carrier 10 are portions of a single rectangular sheet, and are printed at the same time and then folded in half. The two sheets 10a and 10b, therefore, are connected at either the top or bottom of the carrier (where the fold occurs). Rivets 16 and 18 not only provide pivoting of discs 12 and 14, but also hold sheets 10a and 10b together in essentially parallel position.

In another preferred embodiment, first and second sheets 10a and 10b are separately printed sheets. This provides a cost saving over the embodiment in which the two sheets are portions of a single rectangular sheet because a highly accurate fold is not required. In this embodiment, as in the previously discussed embodiment, rivets 16 and 18 not only provide pivoting of discs 12 and 14, but also hold sheets 10a and 10b together in essentially parallel position.

In conclusion, the street address locating aid of the present invention provides significant advantages over prior art devices. It is much smaller than any device conveying similar amounts of information, and contains far more information than any device of comparable size. Although the present invention has been described with reference to preferred embodiments, workers skilled in the art will recognize that changes may be made in form and detail without departing from the spirit and scope of the invention.

What is claimed is:

1. A street address locating aid comprising: a first printed paper disc having a plurality of street addresses printed in first circles on first and second sides thereof and having a plurality of cross streets printed in second concentric circles on the first and second sides;

a second printed paper disc having a plurality of street addresses printed in first circles on first and second sides thereof and having a plurality of cross streets printed in second concentric circles on the first and second sides;

a printed paper carrier having first and second essentially parallel sheets; the first sheet having two street address apertures at which street addresses on the first circles of the first sides of the first and second discs are exposed and having two locations near apertures at which corresponding cross streets from the second concentric circles on the first sides of the first and second discs are exposed; the second sheet having two street address apertures at which street addresses on the first circles of the second sides of the first and second discs are exposed and having two locations near apertures at which corresponding cross streets from the second concentric circles on the second sides of the first and second discs are exposed, wherein the printed paper carrier being essentially rectangular with a width of less than about 10 cm and length of less than about 13 cm, and wherein the carrier has printed thereon a formula for deriving cross street numbers for selected street addresses not printed on the first and second discs by dividing the address number of the street address by a predetermined number and adding a key number for the street listed in the street address, and wherein the carrier also has printed thereon a list of key numbers for a plurality of streets;

first and second connecting means for rotatably connecting the first and second discs at their respective centers between the first and second essentially parallel sheets of the carrier, the centers of the first and second discs being positioned less than the radii of the respective discs from an edge of the carrier so that an edge of each of the first and second discs extends beyond the edge of the carrier, and the centers of the first and second discs being spaced from one another by less than the sum of the radii of the discs so that the first and second discs overlap within the carrier, and wherein the first and second discs have diameters greater than the width of the carrier; and wherein the street addresses in the first circles are arranged on the first and second sides of the first and second discs to provide a reference position in which four different streets with the same selected address number are displayed simultaneously through the four street address apertures, thereby providing a point of reference for a user.

2. The street address locating aid of claim 1 wherein the printed paper carrier has a width of about 6 cm and a length of about 11.5 cm.

3. The street address locating aid of claim 1 wherein the first and second sheets of the carrier comprise a unitary sheet folded in half.

* * * * *